Jan. 9, 1934.  J. ROBINSON  1,942,938
AUTOMATIC TRAIN PIPE CONNECTER
Original Filed May 7, 1929  2 Sheets-Sheet 1
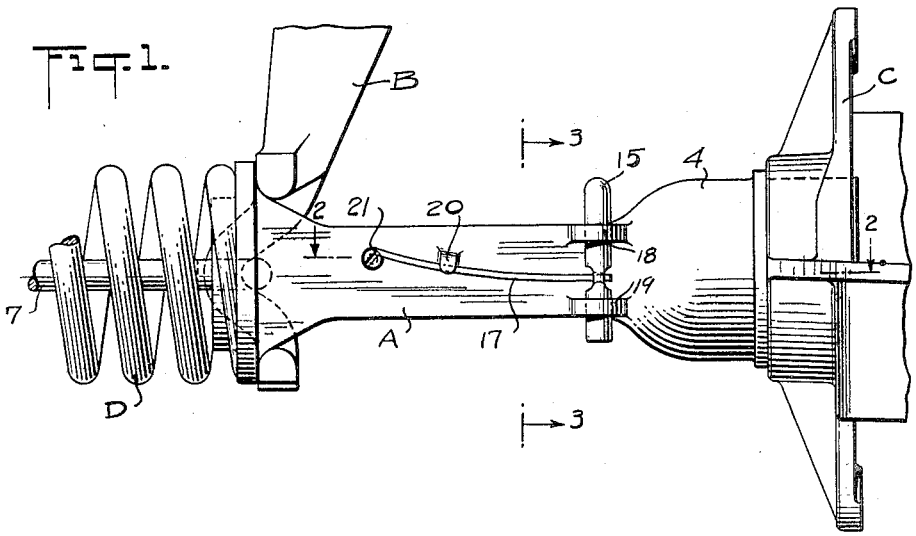
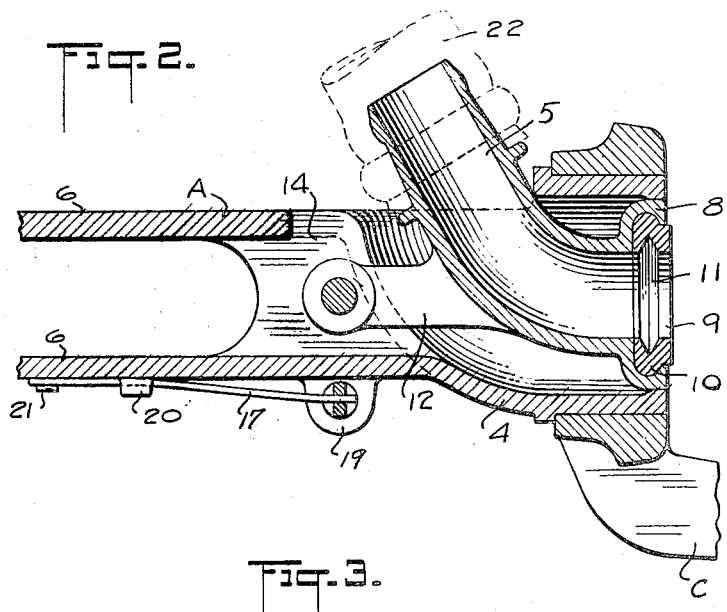
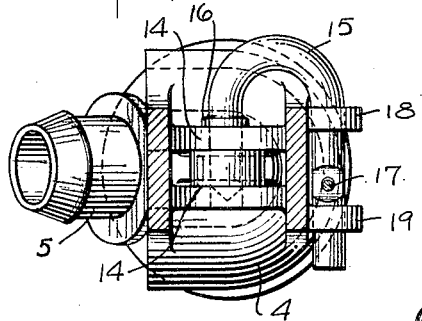
INVENTOR
Joseph Robinson,
BY
Anderson, Cort, Morse & Grindle
ATTORNEYS

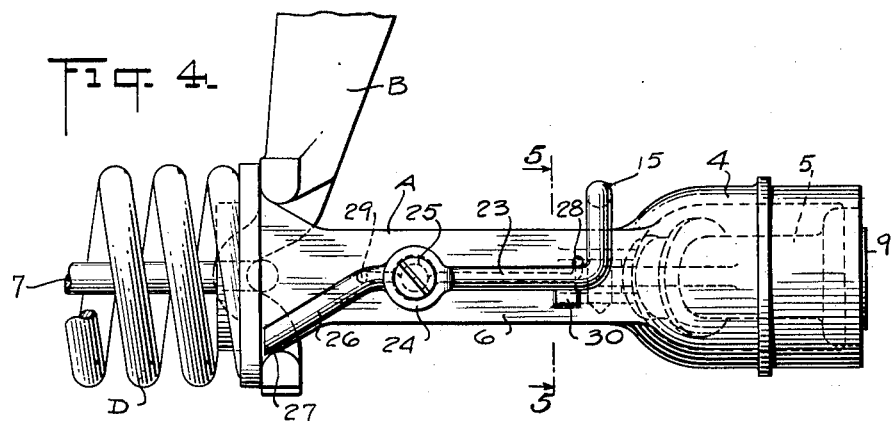
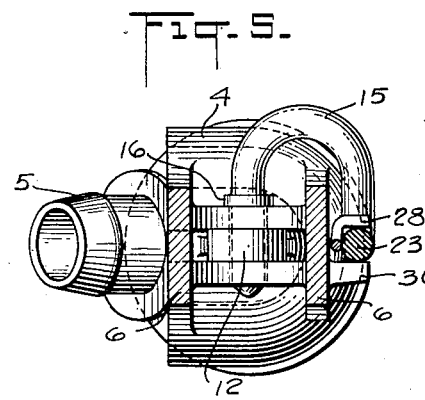
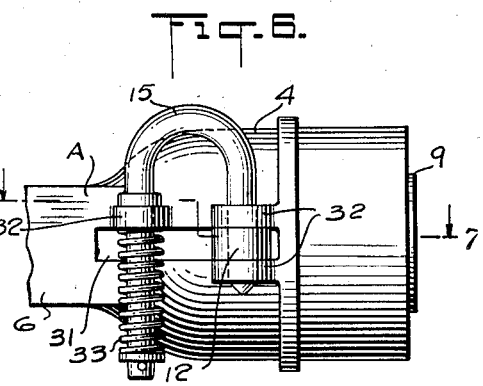
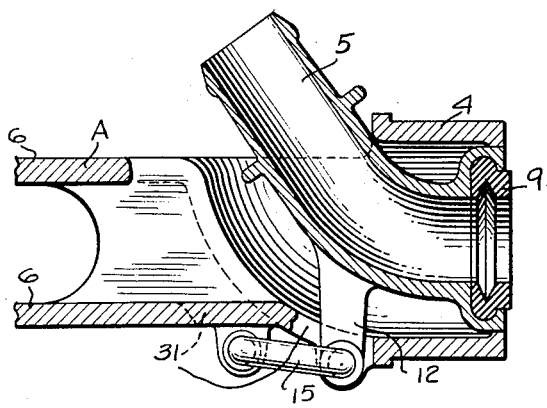
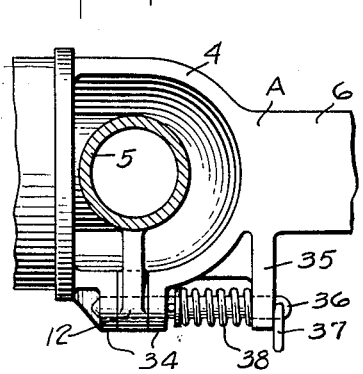

Patented Jan. 9, 1934

1,942,938

UNITED STATES PATENT OFFICE 1,942,938

AUTOMATIC TRAIN PIPE CONNECTER

Joseph Robinson, New York, N. Y., assignor of one-half to Roy M. Wolvin, Montreal, Quebec, Canada Application May 7, 1929, Serial No. 361,141
Renewed May 31, 1933

7 Claims. (Cl. 285—58)

My invention relates to automatic train pipe connecters and particularly to means for removably mounting a gasket carrying fitting in the head of such connecter whereby the gasket may be removed and replaced while the connecter heads remain coupled. More specifically this application relates to an improvement in the gasket renewing means shown in my Reissue Patent #15,639 June 26th, 1923, for Automatic train pipe connecters.

In the accompanying drawings illustrating my improvement.

Figure 1 is a side elevation thereof with some of the associated parts of an automatic connecter broken away;

Figure 2 is a sectional plan view through a part of Figure 1 showing the arrangement of the conduit in the supporting member A;

Figure 3 is a sectional elevation taken on the line 3—3 of Figure 1. In this view the coupling head C is omitted;

Figure 4 is a sectional side elevation of a modification of my improvement, the coupling head C being omitted;

Figure 5 is a sectional elevation taken on approximately the line 5—5 of Figure 4;

Figure 6 is a side elevation of a further modification of my improvement, the coupling head being omitted;

Figure 7 is a sectional plan view on approximately the line 7—7 of Figure 6, and Figure 8 is a detailed side view of another modification of my improvement. In this view a part of the conduit 5 is broken away.

My improvement includes a supporting member A which is hollow at its forward end 4 to receive a laterally diverging curved fitting or conduit 5. The member A includes spaced straps 6 which extend rearwardly from the forward hollow end 4 and span a suitable bracket B. A coupling head C is suitably connected to the forward end of the member A and serves to align the member with an opposing similar member in coupling. A suitable buffer spring D is pivotally anchored to the bracket by means of a tie rod 7 which embraces the lower end of the bracket as shown in Figure 1. It will be understood that by this arrangement the supporting member A is yieldingly sustained on the bracket and that it has rocking movement relative thereto.

In the forward enlarged end 8 of the conduit 5 I provide an interior annular groove and mount therein a suitable gasket 9, preferably having in its flange an interior annular groove or recess 11 for the admission of pressure fluid to force the gasket tightly into its seat in the conduit and forwardly against an opposing gasket. This operation will of course kick the conduit 5 rearwardly firmly against the locking means therefor later to be described. It will be noted that the forward end 4 of the supporting member A is open both at its extreme front end and at one side, and that the conduit 5 occupies both of these openings— see Figure 2.

A lug 12 extends rearwardly from the rear side of the fitting 5 and occupies a recess or seat 14 formed in the supporting member A. A spring actuated plunger pin or locking device 15, preferably U-shaped in side view, extends from outside one of said straps 6 inwardly to a point approximately midway between the straps and passes downwardly through the lug 12 to hold the fitting 5 removably in place. A shoulder 16 formed on the plunger pin limits the downward movement thereof. The upward movement of the pin is limited by contact of the spring 17 with the guide lug 18. The outer projection of the lock or pin 15 is preferably longer than that portion thereof which passes through the lug 12. This longer portion extends downwardly through guide or bearings 18 and 19 formed in lugs which extend laterally away from the outside of one of said straps 6. Located between the bearings 18 and 19 I provide the lock 15 with a perforation which slidingly receives the forward end of the spring 17. The spring may of course be otherwise connected to the plunger pin 15 if desired. On the straps 6 of the member A on which is located the lugs 18 and 19 I provide the member with a stop or anchor lug 20 grooved on its underside to receive the spring 17. I pass the spring under this lug and suitably tie it to the member A as at 21, the spring being under initial tension and serving to hold the lock 15 at the limit of its downward movement. The usual train pipe hose 22 is suitably connected to the conduit 5, as shown in Figure 2.

When it is desired to remove a defective gasket 9 with my improvement, it is necessary to coax the finger of one hand under the lock 15 and lift it out of contact with the lug 12 against the tension of the detaining spring 17. This frees the conduit 5 with respect to the supporting member A therefore the conduit may be withdrawn from the hollow forward end 4 of the member, the gasket 9 renewed and the conduit replaced in the member.

In Figures 4 to 8 inclusive I show three modifications of my improved gasket renewing means. The first is illustrated in Figures 4 and 5 and consists in providing the plunger pin or lock 15 with an elongated rearwardly extending shank 23 perforated at 24 and there pivotally mounted on the member A by means of a suitable pivot 25, secured in one of the straps 6 of the member A. The shank 23 continues past the pivot 25 to form a downwardly extending inclined finger or projection 26. This projection engages the bracket B at 27 and serves to prevent upward movement of the lock 15 until the coupling head C (see Figure 1) is shoved to one side thus rotating the member A out of contact with the bracket B at the point 27 and thus freeing the projection 26 from said contact and permitting the lock 15 to be swung upwardly on its pivot 25. This arrangement provides means for positively locking the lock 15 in the locked position. A suitable spring 28 extends horizontally along the member A and is positioned between it and the shank 23 of the lock 15, and is wrapped around, or otherwise mounted upon, the pivot 25. The spring is anchored at one end to the member A so that when the latch 15 is lifted the spring is placed under additional tension, it being under initial tension normally for the purpose of holding the latch in the locked position. I indicate at 29 that the spring is held inwardly into the straps 6 to anchor the spring as aforesaid. A suitable stop 30 may be provided to limit the downward movement of the latch 15 in lieu of the stop 16.

The modifications shown in Figures 6 and 7 consist in projecting the lug 12 of the conduit 5 transversely of the connecter through an opening 31 in the forward hollow end 4 of the member A. The U-shaped latch 15 lies alongside of the hollow end 4 of the member A and is mounted in bearings or lugs 32 formed thereon. Between two of these bearings the lug 12 of the conduit 5 rests with the latch 15 extending thereto. A suitable coiled spring 33 surrounds the lower end of the latch and is anchored thereto and serves to hold the latch at the limit of its downward movement, thus locking the fitting 5 in place.

In the modification shown in Figure 8 the lug 12 of the fitting 5 extends downwardly through an opening in the bottom of the hollow forward end bow of the member A and is thereafter spanned by ears 34. I provide the member A on its lower side with a bracket or lug 35 which is perforated, and through this lug I pass a straight spring actuated plunger or latch 36 having a ring or head 37 for convenience in shifting the latch in its bearings. The latch extends through the ears 34 and the lug 12, and thus locks the conduit 5 removably in place. A suitable spring 38 is arranged on the latch in such a way as to always hold the latch at the limit of its inward movement which is the position shown in Figure 8. In this embodiment of my invention the lug 12 goes to both position the conduit 5 vertically in the forward end 4 of the member A and also to hold the conduit against undue rearward shifting in the member.

What I claim is:

1. An automatic train pipe connector comprising in combination, a coupling head, a bracket for supporting the head from the car, means connecting the head and bracket, said means including a member having spaced straps which span or embrace the bracket, a conduit extending into the head and supporting a gasket disposed in substantially the plane of the coupling face of the head, said member being provided with a seat and said conduit being provided with a lug which projects into and rests upon said seat, and means for removably locking the conduit in said head and on said seat, said means including a U-shaped latch which extends downwardly through a part of said member and a part of said conduit to anchor the two together, a bearing on one of the straps of said member through which said latch extends and in which it moves, and means in the rear of said latch and connected thereto and to said member for resisting movement of the latch in said bearings and for holding the latch at the limit of its downward movement.

2. An automatic train pipe connecter comprising, in combination, a coupling head, a member connected to the head and extending rearwardly thereof, said member being provided with a hollow forward end, a conduit extending into said forward end and into said head and diverging laterally from said member, said member having a seat formed thereon rearwardly of said hollow end, said conduit having a rearwardly extending lug adapted to rest on said seat, said lug having an opening therein, a vertically slidable U-shaped latch mounted on said member and having one arm thereof arranged to engage in said opening of the lug to lock the conduit on said seat, and a spring engaging the other arm thereof for yieldingly pressing said latch downwardly toward said seat, the bend of said U-shaped latch being positioned above said member and in position to be readily grasped by the finger in lifting the latch.

3. In an automatic train pipe connector in combination, a bracket, a coupling head, a member supported on said bracket and extending forwardly thereof, said head being mounted on the front end of said member, a spring for forcing said member and head forwardly relative to the bracket, said member having a hollow front end, a conduit removably mounted in said hollow end, said conduit having a part provided with an opening, a latch carried by said member and arranged to engage in said opening for locking the conduit in said hollow end of said member, a spring for normally holding said latch in engagement with the opening in said conduit, and means operatively connected to said latch and arranged to engage said bracket when said member is forced forwardly by said first-named spring, whereby said latch is positively held in engagement with the opening in said conduit.

4. In an automatic train pipe connecter in combination, a bracket, a coupling head, a member supported on said bracket extending forwardly thereof, said coupling head being carried on the front end of said member, a spring for forcing said member and head forwardly relative to the bracket, a conduit removably mounted in said hollow end, said conduit having a part provided with an opening, a latch carried by said member and arranged to engage in said opening for locking the conduit in said hollow end of said member, a spring for normally holding the said latch in engagement with the opening in said conduit, said latch having a rearwardly extending shank pivotally connected to said member, said shank extending rearwardly of said pivotal connection and in position to engage a part of said bracket when said member is forced forwardly by said first-named spring, whereby said latch is positively held in engagement with said conduit.

5. In an automatic train pipe connecter, in combination, a head supporting member provided with a hollow forward end, a conduit extending into said forward end and into said head and diverging laterally from said member, said member having a seat formed thereon, said conduit having a lug adapted to rest on said seat when the conduit is inserted in said member, said lug having an opening therein, a vertically slidable U-shaped latch mounted on said member and having one arm thereof arranged to engage in said opening of the lug to lock the conduit on said seat, and a spring engaging the other arm thereof for yieldingly pressing the latch downwardly toward said seat, said latch having a portion thereof in convenient position to be readily grasped by the finger in lifting the latch to release the conduit from said member.

6. In an automatic train pipe connecter, in combination, a head supporting member having a hollow forward end, a conduit arranged in said hollow end, a latch engaging said conduit for locking it in said hollow end, a bracket for supporting said member on a car, a spring for forcing said member forwardly relative to the bracket, and cooperating means on said member and bracket for holding said latch in engagement with said conduit when said member is forced forwardly by said spring.

7. In an automatic train pipe connecter, in combination, a head supporting member having a hollow forward end, a conduit removably mounted in said hollow end, a latch arranged to engage and hold said conduit in said hollow end, a bracket for supporting said member, a spring for pressing said member forwardly relative to the bracket, and means for locking said latch in engagement with said conduit when said member is forced forwardly by said spring.

JOSEPH ROBINSON.